United States Patent [19]

Parker

[11] 4,171,391

[45] Oct. 16, 1979

[54] METHOD OF PREPARING COMPOSITE SHEET MATERIAL

[75] Inventor: Gordon M. Parker, Wilmington, Del.

[73] Assignee: Wilmington Chemical Corporation, Wilmington, Del.

[21] Appl. No.: 940,389

[22] Filed: Sep. 7, 1978

[51] Int. Cl.$^2$ .................. B05D 5/00; B05D 3/02; B05D 1/18

[52] U.S. Cl. .................. 427/246; 260/18 TN; 260/22 TN; 260/29.2 TN; 427/392; 427/439; 428/904; 427/342

[58] Field of Search .............. 427/246, 392, 439, 342; 428/904; 260/18 TN, 22 TN, 29.2 TN

[56] References Cited

U.S. PATENT DOCUMENTS

| | | | |
|---|---|---|---|
| 3,384,502 | 5/1968 | Japs | 427/246 |
| 3,412,054 | 11/1968 | Milligan et al. | 260/18 TN |
| 3,526,531 | 9/1970 | Asano et al. | 427/246 |
| 3,527,653 | 9/1970 | Sommer et al. | 427/246 |
| 3,743,530 | 7/1973 | Oohara et al. | 427/246 |
| 3,772,059 | 11/1973 | Shikada | 427/246 |
| 4,066,591 | 1/1978 | Scriven et al. | 260/29.2 TN |

*Primary Examiner*—Michael R. Lusignan
*Attorney, Agent, or Firm*—Webb, Burden, Robinson & Webb

[57] ABSTRACT

A method of preparing a composite sheet material having properties similar to leather is provided. At least a portion of a porous sheet material is impregnated with an aqueous ionic dispersion of a polyurethane polymer. The polyurethane polymer which is impregnated in the porous sheet is ionically coagulated from the dispersion. Preferably, both the ionic dispersing and coagulating media are removed from the impregnated sheet. The impregnant is then dried to form a composite sheet material.

29 Claims, No Drawings

METHOD OF PREPARING COMPOSITE SHEET MATERIAL

BACKGROUND OF THE INVENTION

1. Field of the Invention

This invention relates to composite sheet material and more particularly, to a method of preparing a composite sheet material from a polyurethane polymer and porous sheet material.

2. Description of the Prior Art

Natural leather, appropriately finished, is valued for its durability and aesthetic characteristics in a plurality of uses. Due to the scarcity of leather and the increased cost of processing leather for particular applications, economics have dictated that synthetic materials be substituted in certain applications where leather goods had been used. Such synthetic materials have been proposed and used in the areas of shoe uppers, upholstery, clothing, luggage making, book binding and similar applications. Because these various applications require varying physical, chemical and aesthetic qualities, different processes using different materials must be used to obtain an acceptable product which is comparable to natural leather; although in most instances these synthetics are readily distinguishable from natural leather.

One method of preparing a synthetic as a substitute for leather involves impregnating and/or coating a porous material, for example, cloth, with a polyurethane, vinyl or a similar material. Polyurethanes have met with wide acceptance as a coating or impregnating composition due to their capability of wide variation in chemical and physical properties, particularly their flexibility and chemical resistance.

Objectives in preparing these synthetic substitutes for leather are that they provide: (1) sheets especially suitable for leather-like and upholstery uses; (2) sheets of uniform width as commonly used in the textile industry (unlike natural products which sustain substantial weight and area losses in cutting and finishing); (3) end use versatility, for example, under a variety of exposure conditions where certain chemical treatments will assist maintenance and useful lifetime of properties; (4) and most importantly, a product with the strength, hand, drape and softness comparable to natural leather.

Further, an impregnated fabric sheet material when used for shoe uppers, should be characterized by a leather-like appearance, with no undesirable fabric show-through, good water vapor permeation into the uncoated inside of the upper, and leather-like grain break (minimal gross wrinkling). "Leather-like grain break", as recognized in the leather and upholstery industries, is manifested in the behavior of well finished leather when folded or crumpled. The leather fold is characterized by a smooth, curved contour, frequently with numerous fine wrinkles in the compressed region of the fold area. This is contrasted with sharp creases or gross wrinkles formed when papers or films are folded; this kind of undesirable appearance is known as "pin wrinkling".

In another application it is desired to provide a strengthened fabric that can be sanded or buffed giving an aesthetically pleasing surface and then used without additional coating as an upholstery material. In upholstery, important characteristics include strength, reduced bias elongation, and enhanced appearance, i.e. a well filled fabric, without substrate show-through, which has softness, drape and conformability. The bias elongation is important in shoe uppers as well as upholstery and reflects a desirable resistance to stretch in the more highly stressed areas of the fabric in the end use; excessive stretch in a fabric will result in pin wrinkling and show-through.

In another application it is desired to provide coated fabrics with increased strength and enhanced appearance. These coated fabrics show actual textile patterns while having improved chemical and physical properties.

Polyurethane polymers as coatings or impregnants for fabric have long been recognized as providing some of the aforementioned characteristics. For example, polyurethanes can be made which are highly resistant to solvents and abrasion, conferring dry-cleanability and outstanding durability to coated fabrics. The basic chemistry of polyurethanes, involving reactions between the isocyanate groups and molecules with multiple reactive hydrogens, such as polyols and polyamines, afford great versatility and variability in final chemical and physical properties by the selection of intermediates to achieve processability and the desired balance of end use performance requirements.

There are various methods for applying polyurethane solutions or other post curable liquid polymers to porous substrates which are well known to those skilled in the art. An article in *Journal of Coated Fabrics*, Vol. 7 (July 1977), pp. 43–57 describes some of the commercial coating systems, e.g. reverse roll coating, pan fed coater, gravure and the like. Brushing and spraying may also be used to coat polyurethanes on porous substrates. These polyurethane solutions, after impregnation or coating on the porous substrate, are dried or cured by a method such as heated air, infrared radiation and the like. Characteristic of these processes is the deposition of a polymer and a film-like layer which tends to produce a coated fabric which folds in undesirable sharp creases rather than a leather-like grain break.

Another method of combining polyurethane solutions with porous substrates is disclosed in U.S. Pat. No. 3,208,875. Briefly, this method involves the application of a solution of a polymer in an organic solvent to a substrate (such as a needle punched polyester batt) with subsequent bathing of the polymeric layer with a mixture of an organic solvent for the polymer and a non-solvent for the polymer, that is at least partially miscible with the solvent until the layer is coagulated into a cellular structure of innerconnected micropores. The solvent is removed from the coating layer along with the non-solvent to produce a solvent-free microporous layer. Although this process yields acceptable properties for a polyurethane impregnated fabric, it has the disadvantages of an organic solvent system particularly when high performance polyurethanes are utilized which require relatively toxic and high boiling solvents.

Polyurethane dispersions in organic vehicles have been proposed and used to coat fabrics. U.S. Pat. No. 3,100,721 discloses dispersions made by the addition of non-solvent to polyurethane solutions. A dispersion, applied to a substrate, is coagulated by further addition of a non-solvent. Although this approach has been used with some success, it involves two major limitations: (1) the vehicle of the dispersion is substantially organic, since relatively small amounts of non-solvent, preferably water, are needed to form a dispersion; and (2) there is a narrow useful range of added non-solvent, so that reproducible results are difficult to obtain.

Although useful products based on solutions or dispersions of polyurethanes in organic vehicles have been provided, a process using water dilutable polyurethane compositions is highly desirable to overcome the impediments of the prior art processes.

Thus, in accordance with the present invention, a process for the preparation of polyurethane polymer impregnated porous substrates is provided in which water is the vehicle for the polyurethane polymer composition.

Further, in accordance with the present invention, the above disadvantages described with the prior art systems, are overcome to provide a leather-like product for a plurality of uses by a single process.

Further, in accordance with the present invention, a process is provided to produce coated fabric.

Further, the attendant advantages of an aqueous system are provided by the present invention.

BRIEF DESCRIPTION OF THE INVENTION

A method of preparing a composite sheet material is provided. At least a portion of a porous sheet material is impregnated with an aqueous ionic dispersion of a polyurethane polymer. The polyurethane polymer which is impregnated in the porous sheet is ionically coagulated from the dispersion. Both the ionic dispersing and coagulating agents are preferably removed from the impregnated sheet and in all instances the impregnant is dried to form a composite sheet material.

DETAILED DESCRIPTION OF THE INVENTION

The polyurethanes useful in the practice of the present invention are those recognized in the art as ionically water dispersible. These dispersions are in contrast with the emulsified isocyanate copolymers such as those disclosed in U.S. Pat. No. 2,968,575 and prepared and dispersed in water with the aid of detergents under the action of powerful shearing forces. The emulsified polyurethanes have the disadvantage that a detergent must be used to form the emulsion and such detergent is usually retained in the dried emulsion coating, thus seriously detracting from the overall physical and chemical properties of the final product. Further, insufficient shearing force results in unstable products, and the material cannot usually be produced in conventional reaction kettles because of the need for a high shearing force.

The preferred system for preparing ionic aqueous polyurethane dispersions is to prepare polymers that have free acid groups, preferably carboxylic acid groups covalently bonded to the polymer backbone. Neutralization of these carboxyl groups with an amine, preferably a water soluble mono-amine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hinderance of the carboxyl by the adjacent alkyl groups. This approach provides the desired carboxyl containing polymer with the carboxylic groups being neutralized with the tertiary mono-amine to provide an internal quaternary ammonium salt and hence, water dilutability.

Suitable carboxylic acids and preferably, the stearically hindered carboxylic acids, are well known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula,

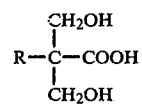

wherein R represents hydrogen, or alkyl of up to 20 carbon atoms, and preferably, up to eight carbon atoms. A preferred acid is 2,2-di-(hydroxymethyl) propionic acid. The polymers with the pendant carboxyl groups are characterized as anionic polyurethane polymers.

Further, in accordance with the present invention, an alternate route to confer water dilutability is to use a cationic polyurethane having pendant amino groups. Such cationic polyurethanes are disclosed in U.S. Pat. No. 4,066,591 incorporated herein by reference, and particularly, in Example XVIII. In the context of the present invention it is preferred that the anionic polyurethane be used.

The polyurethanes useful in the practice of the invention, more particularly involve the reaction of di- or polyisocyanates and compounds with multiple reactive hydrogens suitable for the preparation of polyurethanes. Such diisocyanates and reactive hydrogen compounds are more fully disclosed in U.S. Pat. Nos. 3,412,034 and 4,046,729. Further, the processes to prepare such polyurethanes are well recognized as exemplified by the aforementioned patents. In accordance with the present invention, aromatic, aliphatic and cyclo-aliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cyclo-aliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cyclo-aliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane impregnated sheet material. In addition, antioxidants may be added in art recognized levels to improve the characteristics of the final product. Typical antioxidants are the thioethers and phenolic antioxidants such as 4,4'-butylidine bis-meta-cresol and 2,6-ditert-butyl-para-cresol.

The isocyanate is reacted with the multiple reactive hydrogen compounds such as diols, diamines or triols. In the case of diols or triols they are typically either polyalkylene ether or polyester polyols. A polyalkylene ether polyol is the preferred active hydrogen containing polymeric material for formulation of the polyurethane. The most useful polyglycols have a molecular weight of 50 to 10,000 and in the context of the present invention, the most preferred is from about 400 to about 7,000. Further, the polyether polyols improve flexibility proportionally with the increase in their molecular weight.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound $HO(CH_2OC_2H_4O)_nH$ wherein n is an integer greater than one, can also be used.

The polyol may also be a hydroxy terminated or hydroxy pendant polyester which can be used instead or in combination with the polyalkylene ether glycols. Exemplary of such polyester are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred when flexiblity is desired. These glycols are reacted with aliphatic, cyclo-aliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactone terminated with hydroxyl groups may also be used.

When used herein, "ionic dispersing agent" means a ionizable acid or base capable of forming a salt with the solubilizing agent. These "ionic dispersing agents" are amines and preferably water soluble amines such as triethylamine, tripropylamine, N-ethyl piperidine, and the like; also, acid and preferably water soluble acids such as acetic, propionic, lactic, and the like. Naturally, an acid or amine will be selected contingent on the solubilizing group pendant on the polymer chain.

The desired elastomeric behavior would generally require about 25–80% by weight of long chain polyol (i.e. 700 to 2000 eq. wt.) in the polymer. The degree of elongation and elasticity may vary widely from product to product depending upon the desired properties of the final product.

In forming the polyurethanes useful in the practice of the invention, the polyol and a molar excess of diisocyanate are reacted to form isocyanate terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically the reaction is carried out with stirring at about 50° C. to about 120° C. for about one to four hours. To provide pendant carboxyl groups the isocyanate terminated polymer is reacted with a molar deficiency of dihydroxy acid, for one to four hours at 50° C. to 120° C. to form isocyanate terminated prepolymer. The acid is desirably added as a solution, for example, in N-methyl-1,2-pyrrolidone or N-N-dimethylformamide. The solvent for the acid will typically be no more than about 5% of the total charge in order to minimize the organic solvent concentration in the polyurethane composition. After the dihydroxy acid is reacted into the polymer chain, the pendant carboxyl groups are neutralized with an amine at about 58°–75° C. for about twenty minutes and chain extension and dispersion is accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e. not capable of extensive further curing after formation except by the addition of an external curing agent. Preferably, no such curing agent is added to form the composite sheet material.

Sufficient water is used to disperse the polyurethane at a concentration of about 10–40% by weight solids and a dispersion viscosity in the range of 10–1,000 centipoise. Viscosity may be adjusted in accordance with the particular impregnation properties desired any by the particular dispersion composition which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

The characterization of the dispersions prepared in accordance with the invention is done by measurements of non-volatile content, particle size, viscosity measurements and by stress strain properties on strips of cast film. Useful operational concentration limits of the dispersion are quite broad, i.e. about 5–50%. The lower limit is set by the impracticability of removing gross amounts of water from the impregnated porous substrate and the tendency toward the undesirable showthrough of the substrate. The upper limitation on solids concentration, for those uses such as upholstery where suppleness and drape are desired, is characterized by excessive dispersion viscosity which inhibits rapid and complete permeation to the desired depth and by undesirable fabric stiffness caused by flooding substantially all of the substrate with polymer. The preferred concentration range is from about 10% to 40% by weight solids.

The dispersion viscosity is generally in the range from 10–1,000 centipoise. The low viscosity, relative to that of identical polymers at the same solids level in organic solvent polymer solutions, assists rapid and complete penetration of the aqueous dispersion and subsequent penetration of the coagulant. Useful solutions of polyurethanes will, in contrast, generally have viscosities of several thousand centipoise, ranging as high as 50,000 centipoise at cencentrations of 20–30%.

In one particular application if it is desired to impregnate primarily the surface of the porous substrate with the aqueous dispersions of the invention, water soluble thickeners such as carboxymethyl cellulose may be used to increase viscosity. However, this thickening can also be accomplished by increase in solids concentration.

Particle size, as a useful measure of stability, may be measured by light scattering. Useful dispersions having non-settling characteristics will have particles of a diameter of less than 1 micron.

Porous substrates useful in the practice of the invention include woven and knit fabrics, felts, and non-wovens, such as spun-bonded sheets, needled batts, and waterleaves. Suitable substrate fibers are the natural fibers, particularly cotton (all-cotton and cotton blends with synthetics such as polyester and nylon), and less desirably wool; synthetic fibers such as polyester, nylon, acrylics, modacrylics, and rayons. The fibers may be straight or crimped, continuous filament or staple, or of papermaking length. Naturally, choice of fiber, type of substrate and its construction, and weight/unit area will be made on the basis of cost, end-use requirements, and other considerations commonly recognized in the textile and coated fabric industries, but only contingent on the particular end use for the composite.

In the process of the invention the substrate may be impregnated with polyurethane from about 5% to about 70% of the total composite weight, preferably in the range of 15–50%. Thus, the properties of the substrate porous sheet will strongly affect the properties of the composite fabric. Property measurements pertinent to shoe and upholstery uses on the finished sheets include tensile strength, tear strength, and bias elongation. Film-like impregnant, in contrast to the impregnant produced by this invention, will generally degrade tensile and tear strength and produce gross wrinkling. Uniform appearance and retention of that appearance through the end use of fabricated items is also important. For example, it is usually desirable in suede-type outer-wear to maintain an optically-dull and velvety texture through the normal home care operations of finishing and cleaning that outer-wear will undergo over a period of years.

The manufacture of a satisfactory substrate useful for the process of the invention is known to those of ordinary skill in the textile art. A preferred substrate is a woven fabric of approximately 8 oz./sq. yd. woven from yarns of cotton staple, or a blend of cotton with a man-made fiber. This choice helps assure a strong durable substrate of predictable, reproducible properties. Exemplary of such an operation is: (1) weaving a fabric from a staple-spun yarn; (2) dying the fabric (after removal of size which may be used to assist yarn manufacture and weaving); (3) napping the fabric by brushing or sanding to lift fiber ends from the main fabric; and (4) shearing the fabric precisely to a uniform thickness and openness for subsequent impregnation. Following impregnation by polyurethane dispersion and coagulation, finishing steps commonly will include buffing. Buffing will creat a suede-like surface, or it may be used to assure thickness uniformity to accommodate transfer coating of additional polyurethane.

Because the substrate is porous, the aqueous polyurethane dispersion permeates the pores of the substrate at a rate controlled by the viscosity of the aqueous system and the hydrophilic characteristics of the particular substrate used. Thus, any of the methods used in the coated fabric industry as previously discussed are suitable for impregnating the porous substrate with the aqueous dispersion.

Coagulation is accomplished by contacting the impregnated substrate with an aqueous solution of an ionic media designed to ionically replace the solubilizing ion. In theory, although not intended to be bound by such theory, in the case of an anionically solubilized polyurethane, the amine which neutralizes the carboxyl containing polyurethane is replaced with a hydrogen ion which reverts the anionic pendant carboxyl ion thus reverting the polyurethane polymer to its original, "non-dilutable" condition. This causes coagulation of the polymer within the substrate structure.

In the case of the anionic polymer, aqueous acetic acid solutions at concentrations of 0.5% to about 5% are suitable ionic coagulants for the anionic dispersions and are preferred over stronger acids because of the relative ease of handling, low corrosion potential and disposability. Other acids substantially soluble in water at equivalent concentrations may be used. The coagulation is quite rapid, so rapid, in fact, that polymer is substantially entirely retained within the substrate, with no polymer loss by migration into the ionic solution.

"Salting-out" to coagulate the dispersion by the addition of the neutral salt is feasible, but is not favored because of the large amounts of salt needed, about ten times the concentration of acid, and attendant problems of product contamination.

Because of the many and varied polymers which may be used in the practice of the invention, it is helpful to follow the procedure below to determine coagulation conditions for a particular polymer: (1) prepare a sequence of aqueous dilutions of a selected ionic coagulant, such as acetic acid, specifically 5%, 2.5%, 1.25%, 0.312% and 0.156%; this range—about thirty-fold in acid concentration—will generally cover the practical range of ionic coagulant; (2) stir the coagulant solution in a vessel of about 100 cc., and at a stirring rate of about 300 rpm; (3) drop aqueous polyurethane dispersion into the stirred coagulant, at a rate of about 20 drops per minute. It will be noted that in the higher concentration range, the dispersion will coagulate in well-defined droplets which have an outer surface of coagulated polyurethane; at too low a concentration, a milky dispersion is formed which is unsuitable for the practice of the invention.

These is considerable latitude in selection of operable ionic coagulant concentration, ranging down to about 0.2% acid solution. Specific selection of concentration, of course, will be dictated by the practical requirements of recycling coagulant bath and economical disposal of acid residues.

Retained aqueous phase after the coagulation step is removed by conventional means. For example, the sheet may be passed through squeeze rolls, rinsed in water, and dried by heated air or infrared radiation.

In a typical process the porous substrate is saturated with polyurethane dispersion in a suitable vessel and the excess is removed by squeeze rolls, saturated substrate is then dipped in a suitable volume of ionic coagulant, and the remaining liquid, composed primarily of ionic coagulant and solubilized ion salt, is removed by squeeze rolls. The impregnated substrate is then rinsed and air-dried or dried by heated air or infrared radiation.

While the process may be applied to all water dilutable polyurethanes, the product objective is to provide composites with appearance, strength, conformability, drape, etc., comparable to incumbent materials in shoe, upholstery and leather clothing end uses. A further object of the invention is to provide a coated fabric having the drape and feel of cloth with improved strength and washability. This requires generally that the polyurethanes have a relatively low modulus. The preferred secant modulus range at 100% elongation is 20–100 psi; the useful range is from about 10–1500 psi. Modulus is calculated conventionally from the stress-strain curve obtained from film strips of cast and dried polymer dispersion. Elongation to break signifying acceptable elastic extensibility, calculated from the stress-strain curve should be in the range of 300–800 percent, preferably greater than 500 percent, with elastomeric recovery from extension to twice the unstressed length to within 30 percent of the original length.

After production and drying, the sheets may be buffed by conventional procedures of the leather industry, to yield attractive suede-like effects, and top dressed if desired, particularly for shoe uppers. The sheets may also be coated and combined in laminated structures with foams and fabrics on equipment already used in the leather and coated-fabric industries, such as the transfer coating line of the diagram found in *Coated Fabrics*, Vol. 7 (July 1977), p. 43.

Products of this coagulation process differ from products made by processes whereby the polymer is deposited from aqueous dispersion and evaporation. The evaporation route tends to yield glossy film-like surfaces rather than attractive surfaces with subdued luster, and a tendency to be subject to flex-cracking and other performance and appearance defects. The properties such as desirable break, permeability, drape and softness are believed to relate to the cellular structure produced vs. the dense-polymer structure produced by drying.

Contrasting microscopic structure differences in the polyurethane deposited by the two methods have been demonstrated by applying dispersion to two glass slides, and preparing films by: (1) coagulation by bathing the slide in ionic coagulant; and (2) by drying the dispersion. The product of (1) is white and opaque, resulting from light-scattering by the multitude of fine cells produced, which can be seen in microscopic examination. The product of (2) is generally a clear void-free film, although there may be some haziness. The cellular light-scattering of the coagulated polyurethane is manifested during the coagulation of dispersions within the substrate by a whitening concurrent with coagulant application. The cellular structure, of course, should be durable in use, including cleaning in solvents, to minimize appearance and performance changes with time. This durability is mainly dependent on proper selection of the polymer composition which, as noted, can be made by principles well-known in the polymerization art.

DESCRIPTION OF PREFERRED EMBODIMENTS

The following examples are set forth to illustrate the invention and are not intended to be limiting.

THE PREFERRED EMBODIMENT

A polyurethane polymer is prepared from the following ingredients:

| Ingredient | Equivalents General Range | Preferred Range |
| --- | --- | --- |
| diisocyanate | 3–6 | 3.4–4.5 |
| reactive hydrogen compound (di- or tri-functional) | 1.0 | 1.0 |
| solubilizing compound in the polymer chain | 0.8–1.9 | 1.0–1.7 |
| ionic dispersing agent | 0.4–4 | 0.5–1.5 |

The diisocyanate is reacted with the reactive hydrogen compound under an inert atmosphere until substantially all of the active hydrogen is reacted leaving an N=C=O terminated intermediate. The solubilizing compound is reacted with the intermediate to incorporate the solubilizing group into the polymer chain. The polyurethane polymer is neutralized with the ionic dispersing agent. The polyurethane polymer is then added to a large equivalent excess of water which chain extends the polyurethane polymer, and the solids concentration is adjusted to the desired level by the further addition of water.

A bath, at room temperature, is prepared with the polyurethane dispersion as above described. A porous substrate is impregnated by dipping it into the bath and the excess polyurethane aqueous dispersion is removed by squeezing or the like. The dispersion impregnated substrate is dipped in a bath containing a stoichiometric equivalent or an equivalent excess of coagulating agent thus coagulating the polyurethane from the dispersed phase. The impregnated substrate is washed in water to remove residual dispersing and coagulating agent, excess water is removed by squeezing or the like and the impregnant is dried. Subsequent physical treatment or coating is provided, if necessary, dependent on end use.

EXAMPLE 1

An acid-containing, isocyanate-free polymer dispersed in water was prepared using the following ingredients:

| Ingredient | Parts by Weight |
| --- | --- |
| tolylene diisocyanate | 4.0 |
| GP 6500 triol (hydroxy No. 28 from Choate Chemical Co., Chemical Abstract Service No. 9082-00-2) | 23.0 |
| dimethylol propionic acid | 1.2 |
| N-methyl-2-pyrrolidone | 2.4 |
| N-ethyl morpholine | 1.0 |
| water | 68.4 |

The tolylene diisocyanate was combined with the triol under inert atmosphere with stirring at 10°–30° C. The triol and isocyanate were reacted for two hours with a rate of stirring and rate of combination of ingredients adjusted so temperature was maintained at no more than 80° C. A solution of the acid in the pyrrolidone was then added to the diisocyanate/triol combination; temperature was again maintained below 80° C. over a period of 30–90 minutes. The morpholine was added and the reaction was held for a period of 20 minutes to neutralize the polymer, with mixture temperature held in the range of 55°–75° C. Chain extension and dispersion of neutralized polymer in water was formed by adding the polyurethane to the water and stirring until bubbling, occasioned by the chain-extension reaction in water, subsided; this is typically one to four hours, with a final temperature of 40°–60° C.

Non-volatile content was adjusted to 30% by addition of water to the completed dispersion. Viscosity of this 30% dispersion was 350 centipoise, measured on a Brookfield RVT viscometer. Average particle size, estimated from light scattering (Spectronic 20 [Bausch & Lomb] instrument) was about 0.7 microns. Properties measured using Instron Model 1130 on films cast from the dispersion were as follows:

| 100% modulus | |
|---|---|
| (stress required to double length of sample) | 75 psi |
| tensile strength | 370 psi |
| elongation | 800% |
| recovery | |
| (from extension to twice the original length) | 80% |

EXAMPLE 2

An acid-containing isocyanate-free polymer dispersed in water was prepared from the following ingredients:

| Ingredient | Parts by Weight |
|---|---|
| Hylene W ® | |
| (4,4'-methylene-bis(cyclohexyl isocyanate) | |
| E. I. du Pont de Nemours | 12.1 |
| PCP-0240 | |
| [poly(epsilon-caprolactone) diol of 2000 molecular weight and hydroxyl No. 56] | 23.6 |
| dimethylol propionic acid | 2.2 |
| N-methyl-2-pyrrolidone | 4.9 |
| N-ethyl morpholine | 2.0 |
| Santowhite ® | |
| (4,4'-butylidine bis metacresol) | |
| Monsanto Co. | 0.5 |
| T-12 | |
| (dibutyltin dilaurate) | |
| M&T Chemical Co. | 0.003 |
| water | 54.7 |

The Hylene W ® was combined with the PCP-0240, with stirring, under an inert atmosphere at 50°–90° C. The reaction period was two hours, maintaining a temperature at no more than 90° C. A solution of the acid in pyrrolidone was then added to the diisocyanate/diol combination along with the Santowhite ®. The dibutyltin dilaurate was added and the temperature was maintained at 80° C. or less, for a period of two to three hours. N-ethyl morpholine was added to neutralize the polymer, and the reaction was held for a 30-minute period while holding the temperature at 55°–75° C. The neutralized polymer was chain extended and dispersed in water by rapid stirring. The stirring was continued until foaming subsided, requiring five hours total time for the addition and stirring with a final temperature of 55°–75° C.

Non-volatile content was adjusted to 40% by addition of water to the completed dispersion. Dispersion viscosity and particle size, measured by the procedures of Example 1, was 70 centipoise and 0.2 microns respectively. Properties measured on a dried film cast from the dispersion were as follows:

| 100% modulus | 850 psi |
|---|---|
| tensile strength | 1600 psi |
| elongation | 350% |
| recovery | 55% |

EXAMPLE 3

The dispersion of Example 1 was combined with a cotton fabric by coagulation. A commercially dyed cotton fabric of 60×80 count, weighing 8 oz./sq. yd. was napped and sheared. Test pieces about 1 sq. ft. in area were cut for laboratory processing. Pieces were saturated by dipping in dispersion and passing between nips to remove excess liquid. The sheets were then immersed in a 5% aqueous acetic acid for five minutes, washed in fresh water for five minutes, partially dried by passing them through nip rolls, then oven-dried for five minutes at a temperature of 70° C. Samples of dried sheets were sanded to uniform thickness and tested for key properties related to utility in shoes, with results as follows:

| | Properties of Fabric | |
|---|---|---|
| Method | Original | Treated |
| weight (oz./sq. yd.) | 7.92 | 10.58 |
| add-on (%) | — | 33.6% |
| tensiles (lb.) | 65 × 79 | 90 × 105 |
| tear (trap.) | 5 × 10 | 4 × 8 |
| bias el. (%) | lbs. | lbs. |
| 0 | 0.5 | 2 |
| 10 | 1.0 | 5 |
| 20 | 2.0 | 7.5 |
| 30 | 9.0 | 11.0 |

EXAMPLE 4

The dispersion described in Example 2 was combined with a cotton fabric by coagulation as follows. A commercially dyed cotton fabric of 60×80 count, weighing approximately 8 oz./sq. yd. was napped and sheared. Test pieces of approximately 1 sq. ft. were cut for laboratory processing. Pieces were saturated by dipping in dispersion, the saturated sheets passed between nip rolls to remove excess liquid, immersed in 5% aqueous acetic acid for five minutes, washed in fresh water for five minutes, partially dried by nip rolls, and further dried in an air oven for five minutes at 80° C. The finished sheet was stiff, with boardiness similar to cellulose-based cardboard, but with superior resistance to abrasion and scuffing damage, with utility in book-binding.

EXAMPLE 5

An amine-containing, isocyanate-free polymer dispersed in water was prepared using the following ingredients:

| Ingredient | Parts by Weight |
|---|---|
| Methyl ethyl ketone | 6.8 |

| Ingredient | Parts by Weight |
| --- | --- |
| Hylene W ® | 16.9 |
| 4,4' methylene-bis (cyclohexyl isocyanate) | |
| E. I. du Pont de Nemours | |
| T-12 | 0.002 |
| (dibutyltin dilaurate) | |
| M&T Chemical Co. | |
| CD-230 | 0.8 |
| (cyanoethylated polyoxy-propyleneamine) | |
| Jefferson Chemical Co. | |
| PPG-1025 | 12.8 |
| (polyoxypropylene) diol | |
| Union Carbide Corp. | |
| Methyl diethanol amine | 4.3 |
| Hydrochloric acid solution (1% by wt.) | 40.0 |
| water | 18.3 |

The Hylene W ® and methyl ethyl ketone were combined with stirring at 15°–35° C. Under an inert atmosphere, the CD-230 was added with stirring while a temperature of no more than 50° C. was maintained. The PPG-1025 and the methyl diethanol amine were added successively with stirring. The dibutyltin dilaurate was added and the temperature was maintained at 75°–85° C. for a period of two hours. The water and 1% HCL solution were combined and the polymer was dispersed in the resulting solution by rapid stirring. The stirring was maintained until foaming subsided which required six hours total time for the addition and stirring, with a final temperature of 55°–75° C.

Non-volatile content was adjusted to 24% after filtration by addition of water to the completed dispersion. The viscosity of the dispersion was 15 centipoise, measured on a Brookfield RTV viscometer. The pH was 5.1. Average particle size, estimated from light scattering (Bausch & Lomb Spectronic 20) was about 0.1 microns. Properties measured using Instron Model 1130 on films cast from the dispersion were as follows:

| | |
| --- | --- |
| 100% modulus | |
| (Stress required to double length of sample) | 1300 psi |
| tensile strength | 1950 psi |
| elongation | 220% |
| recovery | |
| (from extension to twice the original length) | 25% |

EXAMPLE 6

The dispersion of Example 5 was combined with a cotton fabric by coagulation. A commercially dyed cotton fabric of 60×80 count, weighing 8 oz./sq.yd. was napped and sheared. Test pieces with an area of about 1 sq. ft. were cut for laboratory processing. The pieces were saturated by dipping in dispersion and then were passed between nip rollers to remove excess dispersion. These saturated sheets were immersed in 10% aqueous sodium hydroxide for five minutes, washed in fresh water for five minutes, partially dried by nip rolls and further dried in an air oven for five minutes at 80° C. The resulting sheet was stiff and boardy, approximating a cellulose-based cardboard, with utility in bookbinding.

As can be well recognized by those skilled in the art, the invention can be used with either anionic or cationic polyurethane polymer aqueous dispersions and a variety of fabrics as the porous substrate. Although the invention has been described with reference to particular materials and produced in accordance with particular methods, the invention is only to be limited insofar as is set forth in the accompanying claims.

I claim:

1. A method of preparing a composite sheet material comprising:
    (a) impregnating at least a portion of a porous sheet material with an aqueous ionic dispersion of a polyurethane polymer having solubilizing ionizable groups covalently bonded to the polymer chain which are reacted with an ionic dispersing agent, said polyurethane polymer having substantially no unreacted N=C=O groups;
    (b) ionically coagulating said polyurethane polymer from said dispersion impregnated in said porous sheet material; and
    (c) drying said impregnant to form a composite sheet material.

2. The method of claim 1 including removing substantially all of the dispersing agent from the impregnated sheet prior to said drying.

3. The method of claim 1 wherein said aqueous ionic polyurethane polymer dispersion has a solids content of 5% to 50% by weight.

4. The method of claim 3 wherein said aqueous ionic polyurethane polymer dispersion has a solids content of 10% to 40% by weight.

5. The method of claim 1 wherein said aqueous ionic polyurethane polymer dispersion has a viscosity of 10 to 5,000 centipoise.

6. The method of claim 5 wherein said aqueous ionic polyurethane polymer dispersion has a viscosity of 10 to 1,000 centipoise.

7. The method of claim 1 wherein said dried composite is comprised of 5% to 70% by weight polyurethane polymer.

8. The method of claim 1 wherein said dried composite is comprised of 15% to 50% by weight polyurethane polymer.

9. The method of claim 1 wherein a porous substrate is selected from the group consisting of woven fabrics, non-woven fabrics, spun-bonded sheets, needled batts and waterleaves.

10. The method of claim 1 wherein said aqueous ionic dispersion of polyurethane is prepared by:
    (a) reacting a stoichiometric excess of diisocyanate with a reactive hydrogen compound to form an isocyanate terminated intermediate;
    (b) reacting the reactive hydrogens of a solubilizing compound with the isocyanate terminated intermediate to impart solubilizing ionizable groups covalently bonded to the polymer chain;
    (c) reacting a dispersing agent with said solubilizing compound; and
    (d) chain extending the product formed in (c), to react substantially all of the N=C=O groups.

11. The method of claim 10 wherein said chain extension is with water.

12. The method of claim 10 wherein said chain extension is with water and a diamine.

13. The method of claim 10 including the step of adjusting the solids concentration by the addition of water.

14. The method of claim 10 wherein said diisocyanate is selected from the group consisting of tolylene diisocyanate, isophorone diisocyanate, and 4,4'-methylene-bis(cyclohexyl isocyanate).

15. The method of claim 10 wherein said reactive hydrogen compound is a diol or triol.

16. The method of claim 15 wherein said diol is a polyether polyol.

17. The method of claim 16 wherein said polyether polyol has a molecular weight of 50 to 10,000.

18. The method of claim 17 wherein said polyether polyol has a molecular weight of at least 400.

19. The method of claim 15 wherein said diol is a polyester diol.

20. The method of claim 19 wherein said diol is polycaprolactone.

21. The method of claim 10 wherein said solubilizing compound is a 2,2-hydroxy methyl substituted carboxylic acid.

22. The method of claim 21 wherein said solubilizing compound is 2,2-di-(hydroxy methyl) propionic acid.

23. The method of claim 10 wherein said dispersing agent is a mono-tertiary amine.

24. The method of claim 23 wherein said mono-amine is N-ethyl morpholine.

25. The method of claim 1 wherein said ionic coagulation is conducted by dipping in an aqueous acid bath.

26. The method of claim 25 wherein said aqueous acid bath contains acetic acid.

27. The method of claim 1 wherein said ionic coagulation is conducted by contacting the impregnated substrate with an aqueous ionic media to replace the ionic dispersing agent.

28. The method of claim 10 wherein said dispersing agent is an acid.

29. The method of claim 28 wherein said ionic coagulation is conducted by dipping in an aqueous base bath.

* * * * *

UNITED STATES PATENT AND TRADEMARK OFFICE
CERTIFICATE OF CORRECTION

PATENT NO. : 4,171,391
DATED : October 16, 1979
INVENTOR(S) : Gordon M. Parker

It is certified that error appears in the above-identified patent and that said Letters Patent are hereby corrected as shown below:

Column 6, line 48 - "any" should read --and--.

Column 8, line 65 - "These" should read --There--.

Column 10, line 59 - In the chart - "hydroxy" should read --hydroxyl--.

Signed and Sealed this

Fifth Day of February 1980

[SEAL]

Attest:

SIDNEY A. DIAMOND

Attesting Officer

Commissioner of Patents and Trademarks